United States Patent Office 3,121,126
Patented Feb. 11, 1964

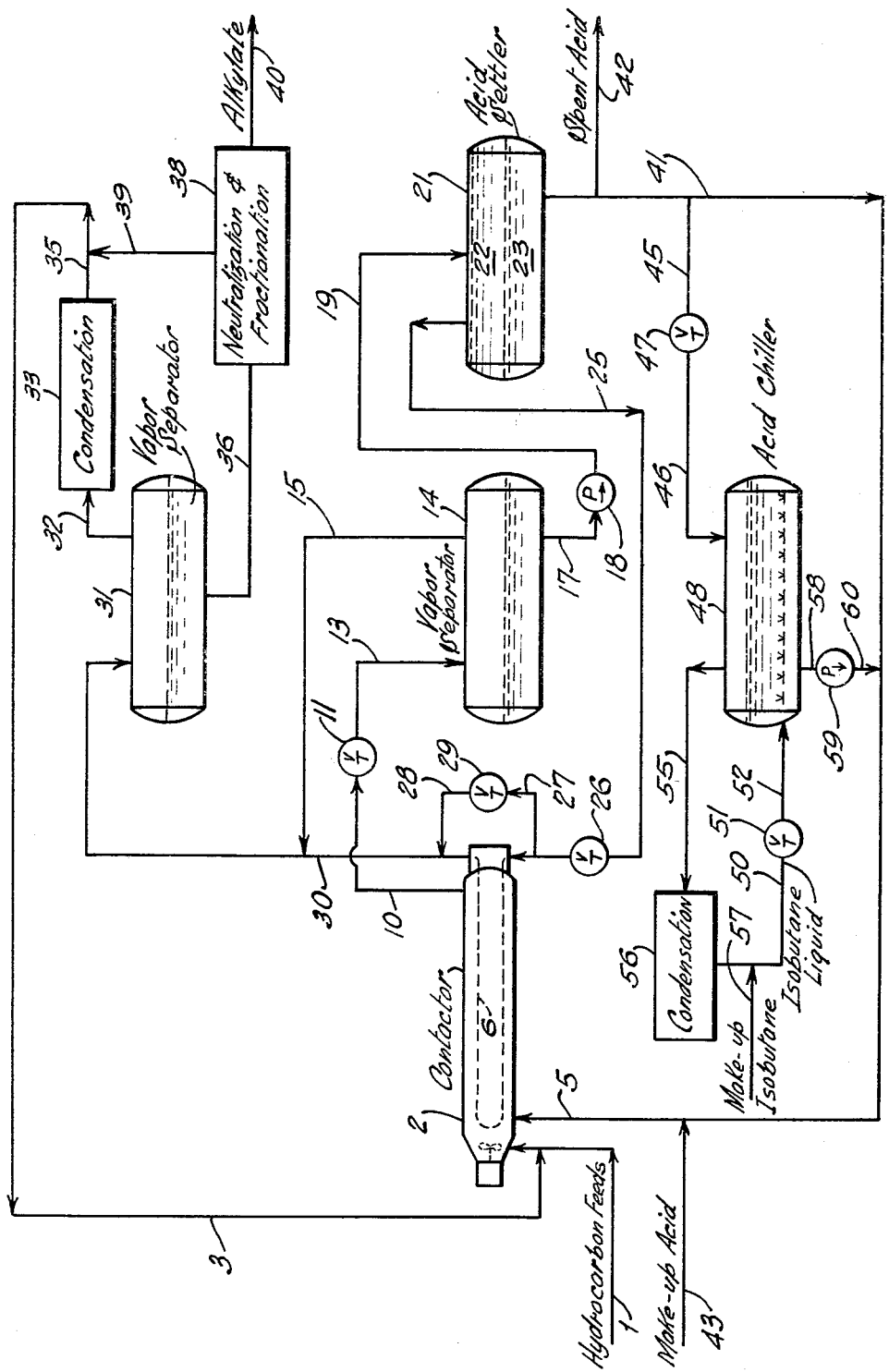

3,121,126
ALKYLATION PROCESS
Arthur R. Goldsby, Chappaqua, N.Y., David K. Beavon, Darien, Conn., and Henry Flynn, Port Arthur, Tex., assignors to Texaco Inc., New York, N.Y., a corporation of Delaware
Filed Sept. 29, 1959, Ser. No. 843,112
6 Claims. (Cl. 260—683.62)

This invention is directed to an improvement in the alkylation of olefin-based alkylatable material with isoparaffin in the presence of an alkylation catalyst. More particularly, it is directed to an alkylation process wherein the liquid reaction mixture comprising an emulsion of olefin-based alkylatable material, isoparaffin, and liquid catalyst is continuously withdrawn from an alkylation zone, passed to a flash zone effecting vaporization of a part of the hydrocarbon component of said reaction mixture and concomitant cooling of resulting vapor and remaining liquid, and the cooled remaining liquid is separated into hydrocarbon and catalyst phases. The cooled hydrocarbon phase is passed in indirect heat exchange with the reaction mixture in the alkylation zone effecting absorption of the heat of reaction and maintenance of the alkylation zone at a temperature favorable for the alkylation reaction. Advantageously the cooled remaining liquid is separated into hydrocarbon and catalyst phases in a settling zone maintained at a pressure at least as high as the pressure of the alkylation zone thereby avoiding ebullition in the settling zone and providing sufficient head to enable return of the catalyst to the reaction zone without pumping. Heretofore the temperatures of the reaction and settling zones have ordinarily been substantially the same. In accordance with the method of this invention, the settling zone is maintained at a temperature independent of and substantially lower than the temperature of the reaction zone. Advantageously, after separation of the cooled hydrocarbon and catalyst phases, the catalyst phase is further cooled before recycle to the reaction zone.

In the catalytic alkylation of olefins with isoparaffins, a preponderance of isoparaffin (generally as much as 70 to 80 volume percent or more of the hydrocarbons in the reaction mixture) over olefin material and hydrocarbon diluents is used to direct the reaction towards production of the most valuable aviation or automotive fuels. Consequently a large quantity of isoparaffin must be recovered and recycled for reuse in the process. Isobutane is generally used as the isoparaffin for the manufacture of aviation or motor fuels although other isoparaffins, for example isopentane, may be employed.

The alkylatable material for reacting with isobutane is olefin-based, that is, it is generally an olefinic hydrocarbon itself such as propylene, butylene or the like, but it also can be an alkyl sulfate or fluoride (as obtained for example in a so-called "two stage" process wherein an olefinic hydrocarbon is absorbed in sulfuric acid or HF as a first stage in the alkylation operation), or an alkyl halide, suitably an alkyl fluoride or chloride which can be made readily from olefinic hydrocarbons by other means.

In catalytic alkylation, the mol ratio of isoparaffin to olefin-based material supplied to the alkylation zone is maintained substantially in excess of 1 to 1, and preferably within the range of about 4 to about 20 to 1. The catalyst to liquid hydrocarbon volume ratio is maintained within the range of about 0.5 to 1 to about 5 to 1 and preferably within the range of about 1 to 1 to about 3 to 1. Catalyst strength is maintained of at least about 88% acid strength when sulfuric acid is used, of at least about 85% titratable acidity when hydrogen fluoride is used or of at least 15 weight percent aluminum chloride (expressed as equivalent aluminum) when aluminum chloride-hydrocarbon complex liquid catalyst is used. A liquid catalyst which is non-volatile under alkylation reaction conditions, for example, sulfuric acid, is preferred. Sulfuric acid strength is maintained within the range of about 88 to 95% by purging spent acid from the system and by adding make-up acid of about 98.0 to 99.9 percent purity.

An important part of the isobutane employed in alkylation processing is a recycle stream produced by fractional distillation of alkylation products in a deisobutanizing fractional distillation zone, the isobutane being recovered as a distillate fraction of high isobutane concentration, for example, about 85 to 95 liquid volume percent isobutane. The higher-boiling alkylate in such distillation zone is recovered in the liquid bottoms fraction. This liquid bottoms fraction may be redistilled in conventional manner to separate light ends and alkylate fractions for use as fuel blending stocks. In the usual deisobutanizing fractional distillation operation, isobutane distillate is returned to the top of the distilling column as reflux at a high reflux ratio, for example 6 to 1, to maintain high isobutane purity in the distillate. As a result, only a small part of the distillate is withdrawn from the column for recycle to the alkylation reactor and only this small part withdrawn is available for maintenance of the isobutane excess required in the reaction mixture.

In the reaction zone conditions of rapid mixing and high ratio of isoparaffin to olefinic material are maintained to promote desired alkylation reactions and avoid reactions such as conjunct polymerization which lead to lowered product quality and catalyst degradation. In the settling zone, mixing is stopped to permit separation of the hydrocarbon and acid catalyst phases and this separation inherently withdraws the excess of isoparaffin from contact with the catalyst. Heretofore, it has been the practice to control the temperature of the reaction zone by refrigeration to absorb the heat of reaction and maintain a desired temperature therein. The cold reaction mixture is typically discharged to a settling zone which assumes a temperature a few degrees above the reaction zone temperature. Although the reaction is substantially completed in the reaction zone, it appears that perceptible reaction occurs in the settling zone. Conditions in the settling zone are adverse since there is no mixing and a large excess of isobutane is not in contact with the catalyst and any reaction occurring in the settling zone may be expected to result in increased acid consumption and poor alkylate quality.

In accordance with the process of our invention, further reaction of the effluent from the reaction zone is stopped and reaction in the settling zone is prevented by cooling the emulsion effluent from the reaction zone prior to its introduction into the settling zone. Although the reaction zone effluent may be cooled by indirect heat exchange with a refrigerant or a cold process stream, it is preferable to flash the effluent effecting regrigeration by vaporization of a part of the hydrocarbon liquid. Flashing as referred to herein denotes the practically adiabatic expansion resulting from a reduction in pressure effecting partial vaporization of hydrocarbon in a hydrocarbon containing stream. Upon expansion in a flash zone, a part of the hydrocarbon in the emulsion is vaporized with concomitant cooling of the resulting vapor and remaining liquid emulsion. Upon cooling, acid degradation reactions in the remaining liquid are immediately arrested.

As a result of cooling the stream passed to the settler, the hydrocarbon and acid streams separated in the settler are cold, and may be employed to assume a large part of the cooling load in the reaction zone. The cold acid recycle cools the contents of the reaction zone by direct heat exchange whereas the separated hydrocarbon may be passed through cooling coils in the reactor in indirect heat exchange with the reaction mixture. Either of the separated streams may be cooled further before use in cooling the reaction zone. For example, the separated hydrocarbon may be reflashed to a lower pressure to effect further chilling. The separated catalyst may be further cooled by external refrigeration or by direct contact with a coolant for example, evaporating liquid isobutane. Cooling the catalyst in a second step may be particularly desirable when employing low catalyst return temperatures, for example, about 15° F., since the viscosity of hydrocarbon-catalyst emulsions is much higher than the viscosity of the separated catalyst or hydrocarbon. For example, it may be desirable to cool the catalyst-hydrocarbon emulsion to about 40° F. by flashing, separate the cooled emulsion into hydrocarbon and catalyst phases at about this temperature, and then to chill the catalyst to about 15° F. by direct contact with evaporating-isobutane before recycle to the reaction zone. In another method of cooling the catalyst after separation from the hydrocarbon phase, the catalyst is cooled by indirect heat exchange employing refrigeration coils immersed in the lower part of the settler. In accordance with this method, the flash cooled emulsion enters the settler at about 40° F., and after separation, the catalyst phase falls into the refrigerated portion of the settler where it is further cooled to about 15 to 35° F.

Heretofore in conventional alkylation systems wherein the settler temperature was dependent upon the temperature of the reaction zone, conditions prevailing in the reaction zone, for example, the degree of mixing, isoparaffin to olefin ratio and temperature have been considered critical and little attention has been given to conditions of settling. It now appears that the temperature of the settling zone is critical and is desirably maintained below 55° F., preferably within the range of about 15 to 45° F., in order to prevent catalyst consuming side reactions. When the settler is maintained within the foregoing critical range, the reaction zone with good mixing and a high ratio of isoparaffin to olefin may be operated at higher temperature without adverse effect upon catalyst life. Alkylation reaction temperatures above 55° F. are employed and preferably within the range of about 60 to 100° F. to achieve rapid and complete reaction.

An advantage of the process of this invention is that the settler in an alkylation system may be operated at a lower temperature than is otherwise practical thereby avoiding the occurrence of side reactions which cause catalyst degradation in the settling zone.

Another advantage of this invention is that the reactor temperature may be controlled independently of the settler temperature thereby permitting the selection of optimum reaction temperatures without encountering catalyst deterioration in the settler.

Another advantage of this invention is that a substantial part or all of the heat load may be transferred from indirect heat exchange to direct cooling with the recycled catalyst.

By effecting settling at an independent lower temperature, the reaction zone is not limited to the low temperatures required to prevent catalyst degradation and the reactor may be operated at higher temperatures favorable to more rapid and complete alkylation. More rapid and complete reaction at higher temperature is effected without impairing acid life by maintaining conditions of good mixing and high isobutane content in the reaction zone.

The accompanying drawing diagrammatically illustrates one form of the process of this invention. Although the drawing illustrates one arrangement of this apparatus in which the process of this invention may be practiced, it is not intended to limit the invention to the particular apparatus or materials described.

Hydrocarbon feed streams including, for example, make-up isobutane and olefinic feed stock are introduced through line 1 into contactor 2. Contactor 2 is shown in the figure as an impeller type with forced internal circulation and a refrigerated internal coil. It will be obvious that we may employ other types of reaction systems, for example, pump and time-tank and jet type contactors. Recycle isobutane is supplied through line 3. Recycle acid is introduced to contactor 2 through line 5. The hydrocarbon feed streams and acid catalyst are mixed in contactor 2 forming a liquid hydrocarbon-catalyst emulsion. Heat of reaction is absorbed by refrigerant passed through cooling coil 6 in contactor 2. A stream of emulsified reactants and catalyst is withdrawn through line 10 and passed through throttle valve 11 effecting partial vaporization of a part of the hydrocarbon component of the emulsion and concomitant chilling. Chilled vapor and liquid in line 13 are discharged into vapor separator 14. Hydrocarbon vapors consisting mainly of isobutane are withdrawn from separator 14 through line 15 and remaining chilled liquid comprising an emulsion of hydrocarbon and catalyst is withdrawn through line 17, and passed by pump 18 through line 19 to acid settler 21. Acid settler 21 provides a quiescent settling zone in which the acid separates from the hydrocarbon phase forming a hydrocarbon layer 22 and a catalyst layer 23. Hydrocarbon is withdrawn through line 25 and is passed through throttle valve 26 and cooling coil 6 in contactor 2 to provide refrigeration of the contents of the reaction zone. The amount of refrigeration effected may be controlled by by-passing a portion of the hydrocarbon liquid around the cooling coil 6 through lines 27 and 28 as controlled by throttle valve 29. Effluent hydrocarbon liquid and vapor from cooling coil 6, hydrocarbon liquid by-passed through line 28 and vapor from separator 14 in line 15 are combined in line 30 and discharged to vapor separator 31. Vaporized hydrocarbon consisting mainly of isobutane separates from liquid comprising alkylate and some isobutane. Vapor from separator 31 is withdrawn through line 32 to condensation equipment 33. Condensation may be effected by compressing and cooling the vapors or by cooling alone with an external refrigeration system. Condensate is withdrawn through line 35 and recycled to contactor 2 through line 3. Liquid withdrawn from separator 31 is passed through line 36 to neutralization and fractionation equipment indicated by the rectangle 38. Separated hydrocarbon rich in isobutane is withdrawn through line 39 and recycled with the isobutane from line 35 to contactor 2 through line 3. Alkylate product is withdrawn through line 40.

Acid catalyst from settler 21 is withdrawn through line 41 and recycled to contactor 2 through line 5. Spent acid is discharged from the system through line 42 and make-up acid as necessary is introduced through line 43. Acid catalyst may be chilled to a lower temperature by passing at least a portion through lines 45 and 46 as controlled by throttle valve 47 to chiller 48. Liquid isobutane in line 50, with make-up isobutane in line 57 from another part of the system, is passed through throttle valve 51 and line 52 into acid chiller 48. The isobutane is chilled in passing through throttle valve 52 and the chilled hydrocarbon is contacted with the acid catalyst in chiller 48 in direct heat exchange. Hydrocarbon vapor or vapor and liquid are withdrawn through line 55 to condensation facility 56 and condensate is recycled to chiller 48. Advantageously condensation facilities 33 and 56 may be a single facility. Chilled acid catalyst is withdrawn from chiller 48 through lines 58 and 60 and pump 59 and passed through lines 41 and 5 to contactor 2.

Example

In the following example, flow rates are given in barrels (42 gallons) of liquid regardless of whether the stream is in the liquid or vapor state. All compositions are given in mol percent.

Fresh feed comprising olefin and isobutane feed streams is provided at a rate of 139 barrels per hour having the following composition:

| | |
|---|---|
| Propane and lighter | 24.4 |
| Propylene | 24.6 |
| Isobutane | 17.0 |
| Butylenes | 13.7 |
| Normal butane | 17.8 |
| Isopentane | 2.5 |
| | 100.0 |

The fresh feed is admixed with 296 barrels per hour of recovered isobutane containing 90.2 percent isobutane and the mixed stream is chilled to 50° F. by indirect heat exchange with crude product. The cooled, mixed stream is combined with 311 barrels per hour of condensate (from vapor produced in flashing and refrigeration) containing 86.0 percent isobutane which is supplied at 22° F. to form a combined hydrocarbon feed stream of 746 barrels per hour at 33° F.

The combined hydrocarbon feed and about an equal volume of sulfuric acid catalyst at a temperature of 32° F. are charged to an alkylation contactor. The sulfuric acid catalyst is maintained at a concentration of about 91.1 percent by withdrawing used acid as necessary and adding make-up acid of 99.5 percent purity. The alkylation contactor is provided with an impeller to emulsify the hydrocarbon and acid catalyst and with internal cooling coils to provide for absorption of heat generated by the alkylation reaction. The contactor is maintained at a temperature of about 50° F. and at a pressure of about 40 pounds per square inch gauge.

Emulsion of hydrocarbon and acid is withdrawn from the contactor, passed through a pressure reduction valve and discharged into a flash drum maintained at a pressure of 5 pounds per square inch gauge. Flashing effects vaporization of 282 barrels per hour of hydrocarbon, mostly isobutane, and chills the resulting vapor and remaining liquid emulsion to a temperature of 32° F. The chilled emulsion is pumped to a settling zone maintained at 50 pounds per square inch gauge which prevents further vaporization in the settling zone which would disturb the quiescent conditions required for settling. The temperature of the settling zone remains at 32° F. indicative that no further reaction occurs in the settling zone. Cold acid from the settler is withdrawn and flows by virtue of the settler pressure to the contactor without the necessity of pumping.

Liquid hydrocarbon phase from the settler is withdrawn and passed through a pressure reduction valve and thence through the cooling coils within the contactor. Absorption of the heat of reaction in the contactor evaporates an additional 65 barrels per hour of hydrocarbon, mostly isobutane. Effluent from the cooling coils is discharged into a liquid-vapor separator from which is withdrawn 375 barrels per hour of crude alkylate hydrocarbon mixture. The crude alkylate mixture is neutralized and fractionated together with 138 barrels per hour of make-up butanes to separate 91 barrels per hour of light alkylate, 3 barrels per hour of heavy alkylate, 123 barrels per hour of normal butane, and 296 barrels of recovered isobutane which is recycled to the alkylation contactor.

Vapor from the flash drum and from the liquid-vapor separators is combined, condensed, depropanized and autorefrigerated to produce 311 barrels per hour of chilled condensate recycle and 36 barrels per hour of propane.

Obviously, many modifications and variations of the invention, as hereinbefore set forth, may be made without departing from the spirit and scope thereof, and therefore only such limitations should be imposed as are indicated in the appended claims.

We claim:

1. In an alkylation process wherein a liquid reaction mixture comprising an emulsion of olefin-based alkylatable material, isoparaffin, and liquid catalyst are maintained under alkylation conditions in an alkylation zone, the improvement which comprises withdrawing a stream of said reaction mixture from said alkylation zone, passing said stream to a flash zone effecting vaporization of a part of the hydrocarbon component of said reaction mixture and concomitant cooling of resulting vapor and remaining liquid emulsion, passing cooled remaining liquid emulsion to a separating zone maintained at a pressure at least the pressure of said alkylation zone, separating cooled remaining liquid emulsion into cooled hydrocarbon and cooled catalyst phases at a pressure of at least the pressure of said alkylation zone, passing at least a part of said cooled catalyst phase to said reaction zone, and passing at least a part of said cooled hydrocarbon phase in indirect heat exchange with said reaction mixture in said alkylation zone.

2. The process of claim 1 wherein said cooled catalyst phase is further cooled after separation from said hydrocarbon phase and before passing to said reaction zone.

3. The process of claim 2 wherein said cooled catalyst phase is further cooled by direct heat exchange with evaporating isobutane.

4. An alkylation process which comprises contacting an olefin-based alkylatable material with an isoparaffin in the presence of an alkylation catalyst as an emulsified liquid reaction mixture in an alkylation zone at a temperature within the range of about 55 to 100° F., withdrawing a stream of said reaction mixture from said alkylation zone to a flash zone effecting vaporization of a part of the hydrocarbon component of said reaction mixture and concomitant cooling of resulting vapor and remaining liquid emulsion to a temperature within the range of about 40 to 55° F., passing said remaining liquid emulsion to a separating zone maintained at a pressure at least the pressure of said alkylation zone separating said stream into cooled hydrocarbon and catalyst phases at a temperature within the range of about 40 to 55° F., further cooling separated catalyst phase to a temperature within the range of about 15 to 35° F., and passing said catalyst phase at a temperature within the range of 15 to 35° F. to said alkylation zone.

5. An alkylation process which comprises contacting an olefin-based alkylatable material with an isoparaffin in the presence of an alkylation catalyst as an emulsified liquid reaction mixture in an alkylation zone at a temperature within the range of about 55 to 100° F., withdrawing a stream of said reaction mixture from said alkylation zone, passing said stream to a flash zone effecting vaporization of a part of the hydrocarbon component of said reaction mixture and concomitant cooling of resulting vapor and remaining liquid emulsion to a temperature within the range of about 15 to 55° F., passing said cooled remaining liquid emulsion to a separation zone maintained at a pressure at least the pressure of said alkylation zone, effecting separation of said cooled remaining liquid emulsion into cooled hydrocarbon and cooled catalyst phases at a temperature within the range of 15 to 55° F., and passing at least a part of said cooled hydrocarbon in indirect heat exchange with said reaction mixture in said alkylation zone.

6. An alkylation process which comprises contacting an olefin-based alkylatable material with an isoparaffin in the presence of an alkylation catalyst as an emulsified liquid reaction mixture in an alkylation zone at a temperature within the range of about 55 to 100° F., withdrawing a stream of said reaction mixture from said alkylation zone to a flash zone effecting vaporization of the part of the hydrocarbon component of said reaction mixture and concomitant cooling of the resulting vapor and remaining liquid emulsion to a temperature within the range of about 15 to 55° F., passing remaining liquid emulsion to a separating zone maintained at a pressure at least the pressure of said alkylation zone, separating said remaining liquid emulsion into cooled hydrocarbon and catalyst phases at a temperature within the range of 15 to 55° F., and passing at least a part of said cooled hydrocarbon in indirect heat exchange with said reaction mixture in said alkylation zone.

References Cited in the file of this patent

UNITED STATES PATENTS

| | | |
|---|---|---|
| 2,334,955 | Putney | Nov. 23, 1943 |
| 2,428,506 | Van der Valk | Oct. 7, 1947 |
| 2,488,943 | Shearer | Nov. 22, 1949 |
| 2,664,452 | Putney | Dec. 29, 1953 |